United States Patent
LoCascio et al.

(10) Patent No.: US 6,571,028 B1
(45) Date of Patent: May 27, 2003

(54) OPTICAL SWITCH HAVING A SATURABLE ABSORBER

(75) Inventors: Michael LoCascio, Albany, NY (US); Clinton T. Ballinger, Burnt Hills, NY (US); Daniel P. Landry, Cliffton Park, NY (US); James E. Raynolds, Schenectady, NY (US)

(73) Assignee: Evident Technologies, Troy, NY (US)

( * ) Notice: Subject to any disclaimer, the term of this patent is extended or adjusted under 35 U.S.C. 154(b) by 217 days.

(21) Appl. No.: 09/737,470

(22) Filed: Dec. 18, 2000

Related U.S. Application Data
(60) Provisional application No. 60/191,074, filed on Mar. 21, 2000.

(51) Int. Cl.[7] ............ G02F 1/295; G02F 1/03; G02B 6/35
(52) U.S. Cl. ............ 385/16; 385/5; 385/23; 385/39; 359/244
(58) Field of Search ............ 359/240, 241, 359/244, 243; 385/5, 16, 23, 31, 37, 39, 50

(56) References Cited

U.S. PATENT DOCUMENTS

| | | | |
|---|---|---|---|
| 4,941,725 A | * 7/1990 | Normandin | 385/1 |
| 5,059,003 A | 10/1991 | Haus et al. | |
| 5,436,754 A | 7/1995 | Ishihara et al. | |
| 5,449,645 A | 9/1995 | Borrelli et al. | |
| 5,464,991 A | 11/1995 | Manabe et al. | |
| 5,474,591 A | 12/1995 | Wells et al. | |
| 5,505,928 A | 4/1996 | Alvisatos et al. | |
| 5,525,377 A | 6/1996 | Gallagher et al. | |
| 5,690,807 A | 11/1997 | Clark, Jr. et al. | |
| 5,705,321 A | 1/1998 | Brueck et al. | |
| 5,783,263 A | 7/1998 | Majetich et al. | |
| 5,906,670 A | 5/1999 | Dobson et al. | |
| 6,057,561 A | 5/2000 | Kawasaki et al. | |
| 6,090,666 A | 7/2000 | Ueda et al. | |
| 6,106,609 A | 8/2000 | Yang et al. | |
| 6,126,740 A | 10/2000 | Schulz et al. | |
| 6,274,323 B1 | 8/2001 | Bruchez et al. | 435/6 |
| 6,298,180 B1 | * 10/2001 | Ho | 385/122 |
| 6,323,983 B1 | * 11/2001 | Yamaguchi | 359/244 |

OTHER PUBLICATIONS

Arthur J. Nozik et al.; Colloidal Quantum Dots of III–IV Semiconductors; pp. 24–30, MRS Bulletin/Feb. 1998.*

P.T. Guerreiro et al.; PbS Quantum–Dot Doped Glasses as Saturable Absorbers for Mode Locking of a Cr:forsterite Laser; Optical Sciences Center, pp. 1595–1597, App. Phys. Lett. 71 (12), Sep. 22, 1997.*

G.C. Chovet et al.; Electroabsorption Dynamics in an InGaAsP/InGaAsP Superlattice Modulator; OSA TOPS on Ultrafast Electronics and Optoelectronics, 1997, pp. 276–279, vol. 13, Optical Society of America.

P.T. Guerreiro et al.; Pbs quantum–dot doped glasses as saturable absorbers for mode locking of a Cr:forsterile laser; OpticalSciences Center, pp. 1595–1597, App. Phys. Lett. 71 (12), Sep. 22, 1997.

J. Mangeney et al.; Ultrafast saturable absorption at 1.55 um in heavy–ion–irradiated quantum–well vertical cavity; Applied Physics Letters; Mar. 13, 200, vol. 76, No. 11, pp. 1271–1373.

(List continued on next page.)

*Primary Examiner*—Hemang Sanghavi
*Assistant Examiner*—Omar Rojas
(74) *Attorney, Agent, or Firm*—Kenyon & Kenyon

(57) ABSTRACT

An optical switch includes a saturable absorber. Coupled to the saturable absorber is an input waveguide, an output waveguide, and a control beam waveguide. In the absence of light input to the control beam waveguide, the saturable absorber prevents an input signal on the input waveguide from passing through and being output on the output waveguide, thus placing the switch in an "off" state. In the presence of light input to the control beam waveguide and incident of the saturable absorber, the saturable absorber allows the input signal to pass through and be output on the output waveguide, thus placing the switch in an "on" state.

44 Claims, 7 Drawing Sheets

OTHER PUBLICATIONS

G. Tamulaitis et al.; Optical nonlinearities of glass doped with PbS nanocrystais; Journal Of Applied Physics, vol. 88, No. 1, Jul. 1, 2000, pp. 178–182.

K. Ogawa et al.; Femtosecond Reflectivity of InP/InGaAs Nonlinear Bragg Reflector, OSA TOPS on Ultrafast Electronics and Optoelectronics, 1997, vol. 13, pp. 272–275, M. B. Yairi et al.; High–speed, optically controlled surface–normal optical switch based on diffusive conduction; Applied Physics Letters; vol. 75, No. 5, pp. 597–599.

M. Livingstone et al.; Comparison of optical nonlinearities in piezoelectric strained [111]–and [001]–grown (In,Ga)As/(Ai,Ga)As quantum wells; Phys. Lett. 65(22), Nov. 28, 1994; pp. 2771–2773.

Xiong Zhang et al.; Optical property of GaAsP/AoGaAs strained–layer quantum well grown on GaAs–(111)B substrate; pp. 186–188; Appl. Phys. Lett. 66 (2), Jan. 9, 1995.

Tomoyuki Akiyama et al.; Sub–pJ operation of broadband asymmetric Fabry–Perot all–optical gate with coupled cavity structure; pp. 1545–1547, Applied Physics Letters; vol. 72, No. 13, Mar. 30, 1998.

C. Knorr et al.; A mechanism for low–power all–optical switching in multiple–puantum–well structures; pp. 4212–4214; Appl. Phys. Lett. 69 (27), Dec. 30, 1995.

S. Janz et al.; Low threshold optical bistable in an asymmetrically shifted distributed–feedback heterostructure; pp. 1051–1053; Appl. Phys. Lett. 67 (8,: Aug. 21, 1995.

Tzong–Yow Tsai et al.; $C0^2$+:ZnS and $Co^2$+:ZnSe saturable absorber Q switches; Journal of Applied Physics, vol. 87, No. 1, pp. 25–29, Jan. 1, 2000.

Paul W. Juodawlkis et al.; Subpiosecond nonlinear absorption recovery dynamics of low–temperature–grown $In_{0.53}Ga_{0.47}As/In_{0.52}Al_{0.48}As$ multiple quantum well p–l–n structures; OSA TOPS on Ultrafast Electronics and Optoelectronics, 1997; pp. 284–289, vol. 13, Martin Nuss and John Bowers (ed.).

Arthur J. Nozik et al.; Colloidal Quantum Dots Of III–V Semiconductors; pp. 24–30, MRS Bulletin/Feb. 1998.

D. Bimberg et al. Growth, Spectroscopy, and Laser Application of Self–Ordered III–V Quantum Dots; pp. 31–42, MRS Bulletin/Feb. 1998.

Daniel Gammon; High–Resolution Spectroscopy of Individual Quantum Dots in Wells; pp. 44–48 MRS Bulletin/Feb. 1998.

Encai Hao et al.; Synthesis and Optical Properties of CdSe and CdSe/CdS Nanoparticles; Chem Mater. 1999, 11, 3098–3102.

Seigo Tarucha; Transport in Quantum Dots: Observation of Atomlike Properties; pp. 49–52, MRS Bulletin/Feb. 1998.

A.P. Alivisatos; Electrical Studies of Semiconductor–Nanocrystal Colloids; pp. 18–24, MRS Bulletin/Feb. 1998.

Alex Zunger; Semiconductor Quantum Dots; pp. 15–17, MRS Bulletin/Feb. 1998.

Gordan A. Thomas et al.; Physics in The Whirlwind of Optical Communications; pp. 30–36, Sep., 2000 Physics Today.

* cited by examiner

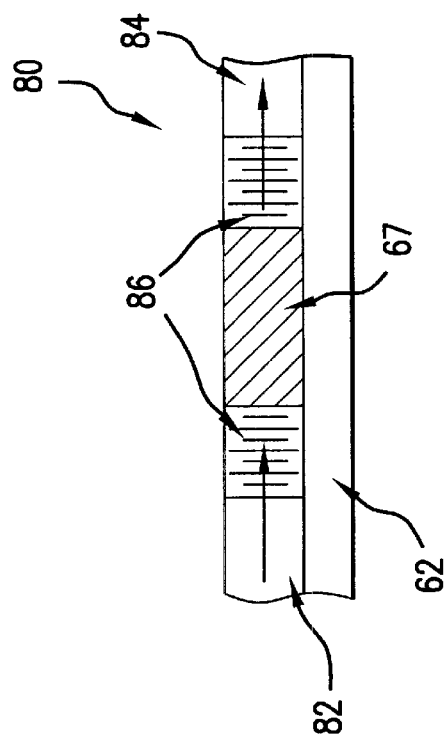
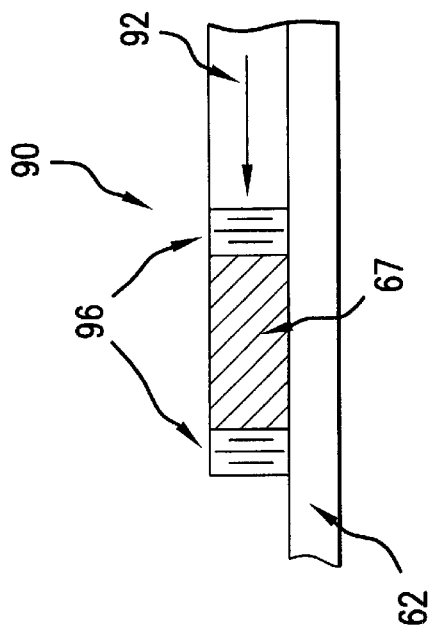
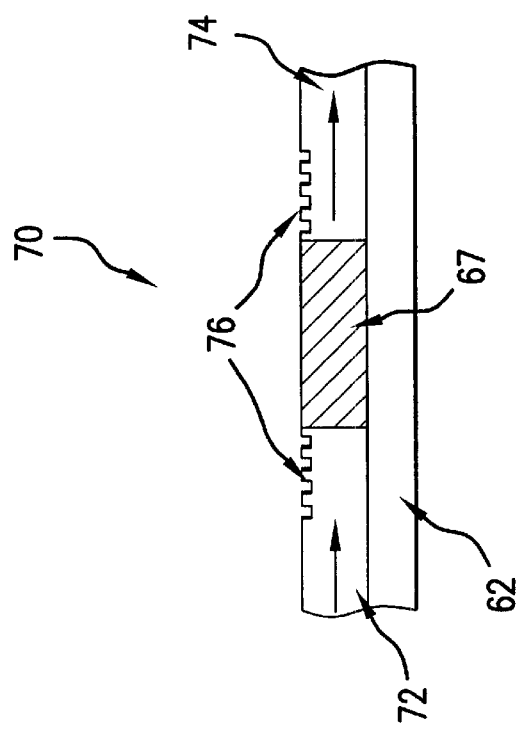

OPTICAL SWITCH HAVING A SATURABLE ABSORBER

CROSS-REFERENCES TO RELATED APPLICATIONS

This application claims the benefit of U.S. Provisional Application Serial No. 60/191,074, filed Mar. 21, 2000.

FIELD OF THE INVENTION

The present invention is directed to optical communications. More particularly, the present invention is directed to an optical switch for an optical network.

BACKGROUND INFORMATION

The enormous increase in data traffic, largely due to the growth in Internet traffic, has spurred rapid growth in broadband communication technologies. Fiber optics, which offers the largest bandwidth of any communication system, is the medium of choice for carrying the multitude of data now being sent through networks. While fiber can theoretically carry over 50 terabits per second, current optical communication systems are limited to 10 gigabits per second due to the limitations of the switching nodes.

Switching nodes consist of systems dedicated to switching the optical signals between lines as well as providing other signal processing functions, such as amplification and signal regeneration. Switching nodes include components such as optical switches, add/drop multiplexers, channel converters, routers, etc.

Prior art "optical" switches used in switching nodes are typically not entirely optical and therefore operate relatively slowly and have limited bandwidth. One type of known prior art switch is an opto-mechanical switch. Opto-mechanical switches use moving (e.g., rotating or alternating) mirrors, prisms, holographic gratings, or other devices to deflect light beams. The mechanical action may involve motors, or piezoelectric elements may be used for fast mechanical action. For example, Lucent Corporation and other companies have introduced a type of opto-mechanical switch referred to as a micro-electro-mechanical switch ("MEMS"). MEMS consist of arrays of actuated micromirrors etched onto a silicon chip in a similar manner to that of electrical integrated circuits. The mirrors change angle based upon an electrical signal and route an incident optical signal to one of many output fibers.

Another example of an opto-mechanical switch is a device from Agilent Technologies that steers optical signals through the controlled formation of gas bubbles within a liquid waveguide. A bubble is formed at the junction of one input and several output waveguides. The bubble will reflect an optical signal down one output while a lack of bubble will allow the signal to propagate through another waveguide.

A major limitation of opto-mechanical switches is low switching speeds. Typical switching times are in the millisecond range. The advantages of opto-mechanical switches are low insertion loss and low cross-talk.

Other prior art devices use electro-optic materials which alter their refractive indices in the presence of an electric field. They may be used as electrically controlled phase modulators or phase retarders. When placed in one arm of an interferometer, such as a Mach-Zender interferometer, or between two crossed polarizers, the electro-optic cell serves as an electrically controlled light modulator or a 1×1 (on-off) switch. The most prevalent technology for electro-optic switching is integrated optics since it is difficult to make large arrays of switches using bulk crystals. Integrated-optic waveguides are fabricated using electro-optic dielectric substrates, such as Lithium Niobate ("LiNBO$_3$"), with strips of slightly higher refractive index at the locations of the waveguides, created by diffusing titanium into the substrate. The major drawbacks of Lithium Niobate technology is the high expense of the material and difficulty in creating low loss waveguides within it.

Liquid crystals provide another technology that can be used to make electrically controlled optical switches. A large array of electrodes placed on a single liquid-crystal panel serves as a spatial light modulator or a set of 1×1 switches. The main limitation is the relatively low switching speed.

Other prior art optical devices include acousto-optic switches which use the property of Bragg deflection of light by sound. An acoustic wave propagating along a dielectric surface alternatively puts the material in compression and tension. Thus, the acoustic pressure wave periodically alters the refractive index. The change in the refractive index is determined by the power of the acoustic wave, while the period of the refractive index change is a function of the frequency of the acoustic wave. Light coupled with the periodically alternating refractive index is deflected. A switching device can be constructed where the acoustic wave controls whether or not the light beam is deflected into an output waveguide.

Some prior art optical devices use magneto-optic materials that alter their optical properties under the influence of a magnetic field. Materials exhibiting the Faraday effect, for example, act as polarization rotators in the presence of a magnetic flux density B. The rotary power ρ (angle per unit length) is proportional to the component B in the direction of propagation. When the material is placed between two crossed polarizers, the optical power transmission $T=\sin^2\Theta$ is dependent on the polarization rotation angle Θ=ρd where d is the thickness of the cell. The device is used as a 1×1 switch controlled by the magnetic field.

Finally, prior art optical devices do exist that can be considered "all-optical" or "optic-optic" switches. In an all-optical switch, light controls light with the help of a non-linear optical material. They operate using non-linear optical properties of certain materials when exposed to high intensity light beams (i.e., a slight change in index under high intensities).

FIG. 1 illustrates a prior art all-optical switch 20 that uses an interferometer. Switch 20 includes material 14 that exhibits the optical Kerr effect (the variation of the refractive index with the applied light intensity) which is placed in one leg of a Mach-Zender interferometer. An input signal 10 is controlled by a control light 16. As control light 16 is turned on and off, transmittance switch 20 at output 12 is switched between "1" and "0" because the optical phase modulation in Kerr medium 14 is converted into intensity modulation.

FIG. 2 illustrates a prior art all-optical switch 30 that uses an optical loop. Switch 30 is a non-linear optical loop mirror ("NOLM") that includes a fused fiber coupler (splitter) 34 with two of its arms connected to an unbroken loop of fiber 32. A signal arriving at the input 36 to coupler 34 is split and sent both ways around fiber loop 32. One of the lengths of loop 32 contains a Kerr medium. The Kerr medium is pumped via another high intensity control beam that alters the refractive index of the material and thus slightly changes the speed at which the signal beam propagates through. When the two signal beams recombine at the other end of loop 32 interference effects determine the amplitude of the output 38. Although a NOLM operates at high speeds (tens of picoseconds), it requires long lengths of fibers and is not readily integratable.

The retardation between two polarizations in an anisotropic non-linear medium has also been used for switching by placing the material between two crossed polarizers. FIG. 3 illustrates a prior art all-optical switch 30 using an anisotropic optical fiber 42 that exhibits the optical Kerr effect. In the presence of a control light 43, fiber 42 introduces a phase retardation π, so that the polarization of the linearly polarized input light 45 rotates 90° and is transmitted at output 46 by an output polarizer 48. In the presence of control light 43, fiber 42 introduces no retardation and polarizer 48 blocks input light 45. A filter 44 is used to transmit input light 45 and block control light 43, which has a different wavelength.

FIG. 4 illustrates another prior art all-optical device 50 that uses liquid-crystal. Device 50 includes an array of switches as part of an optically addressed liquid-crystal spatial light modulator 52. A control light 54 alters the electric field applied to the liquid-crystal layer and therefore alters its reflectance. Different points on the liquid-crystal surface have different reflectances and act as independent switches controlled by input light beams 58 and output as output light beams 56. Device 50 can accommodate a large number of switches, but is relatively slow.

Still another all-optical switch is based on an optically pumped Semiconductor Optical Amplifier ("SOA"). A SOA is a laser gain medium without a resonator cavity. A SOA-based switch operates similar to the NOLM in that it operates on interference between laser beams. Like the NOLM, SOA-based devices have significant loss and require high operating power. They also suffer other non-linear effects including frequency addition, which has the effect of switching the data to a different wavelength channel. These detriments have prevented SOAs from being commercially viable.

Based on the foregoing, there is a need for an all-optical switch having low power requirements and fast switching speeds.

SUMMARY OF THE INVENTION

One embodiment of the present invention is an optical switch that includes a saturable absorber. Coupled to the saturable absorber is an input waveguide, an output waveguide, and a control beam waveguide.

BRIEF DESCRIPTION OF THE DRAWINGS

FIG. 7 is a cross-sectional view of a switch in accordance with one embodiment of the present invention in which the input waveguide and the output waveguide have a Bragg Grating antireflective region.

FIG. 8 is a cross-sectional view of a switch in accordance with one embodiment of the present invention in which the input waveguide and the output waveguide have a thin film dielectric antireflective layer.

FIG. 9 is a cross-sectional view of a switch in accordance with one embodiment of the present invention in which the intensity of the control beam is enhanced within the SA material.

DETAILED DESCRIPTION

One embodiment of the present invention is an optical switch that includes a saturable absorber that functions as an active region. The switch has an optical input and output, and is controlled by an optical control signal.

Figure 1:
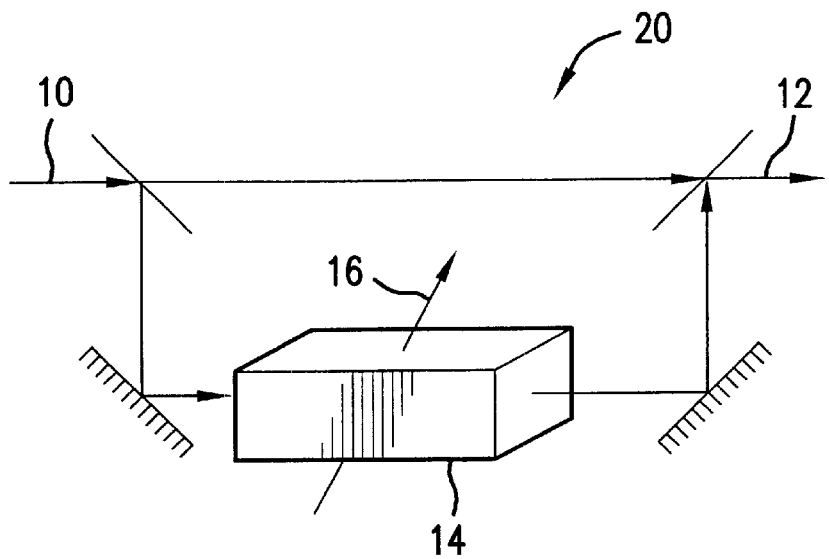
FIG. 1 illustrates a prior art all-optical switch that uses an interferometer.
Figure 2:
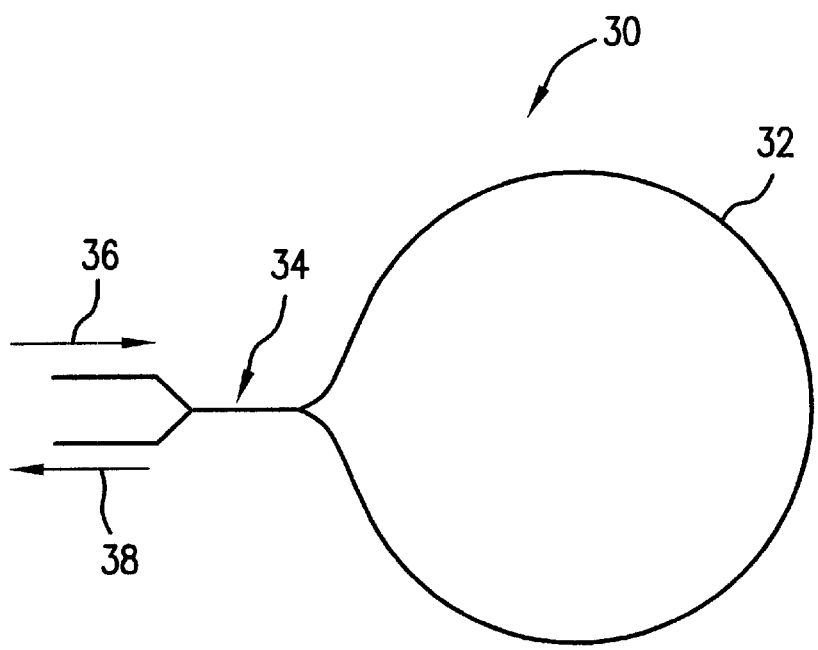
FIG. 2 illustrates a prior art all-optical switch that uses an optical loop.
Figure 3:
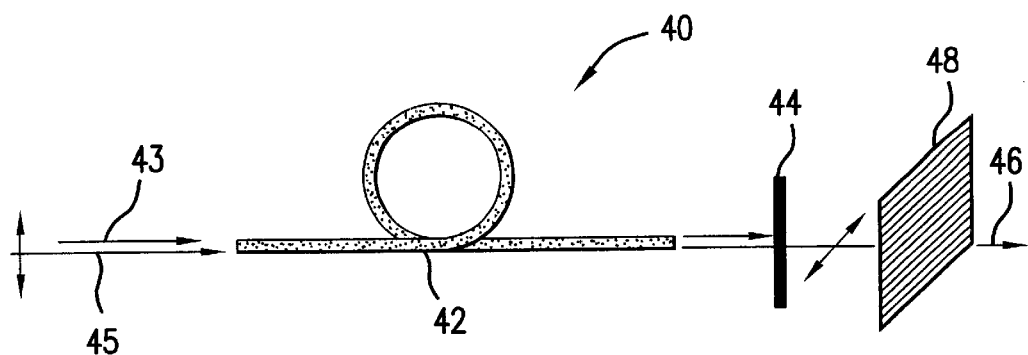
FIG. 3 illustrates a prior art all-optical switch using an anisotropic optical fiber that exhibits the optical Kerr effect.
Figure 4:
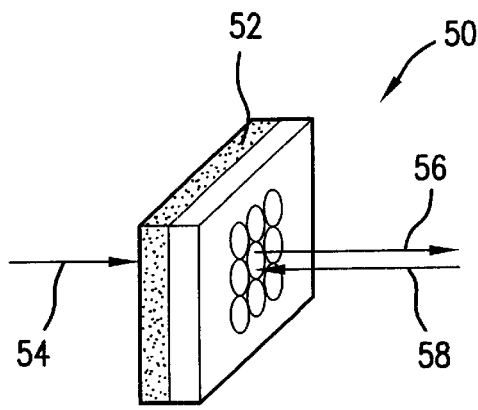
FIG. 4 illustrates a prior art all-optical device that uses liquid-crystal.
Figure 5:
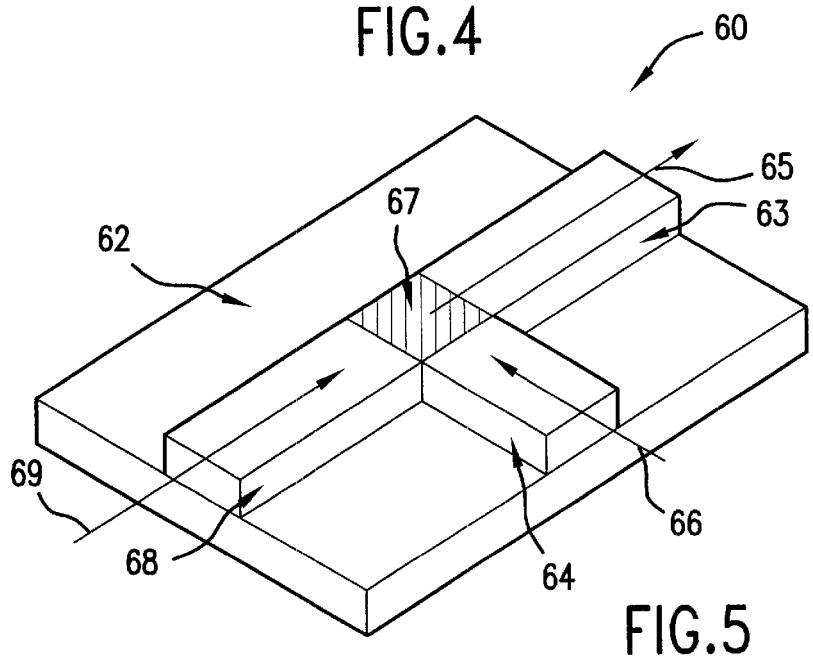
FIG. 5 is a perspective view of an optical switch in accordance with one embodiment of the present invention.

FIG. 5 is a perspective view of an optical switch 60 in accordance with one embodiment of the present invention. Switch 60 includes a slab of saturable absorber material ("SA material") 67 formed on a substrate 62. Coupled to SA material 67, and also formed on substrate 62, is an input waveguide 68, a control beam waveguide 64 and an output waveguide 63. In operation, an optical input signal 69 is input to input waveguide 68. In an "off" state no control signal is input to control waveguide 64, and therefore no control beam is incident upon SA material 67. In this state, SA material 67 is highly absorbing and input signal 69 is not output on output waveguide 63. In an "on" state a control beam 66 is input to control waveguide 64. Control beam 66 is a high intensity beam which when incident on SA material 67, causes SA material 67 to become more transparent. This allows input signal 69 to be output on output waveguide 63 as an output signal 65.

In general, a saturable absorber such as SA material 67 is a material that displays a reduction in the absorption coefficient at the operational wavelength with increased incident light intensity. The behavior of such a material can be modeled as a two state system, i.e., a system possessing two quantum states of different energies that an electron can exist in. In the natural state of the material, one in which no light is incident upon the material, all electrons lie in the lower energy state. An incident photon having a wavelength (hence energy) that corresponds to the energy difference between the quantum states will be absorbed if it excites an electron from the lower energy level to the upper energy level.

An electron in the upper state will drop back to the lower energy level in one of two ways. It can (1) spontaneously drop back and release energy as heat (referred to as "non-radiative recombination") or as a photon of the same wavelength that originally excited it (referred to as "spontaneous radiative recombination" or "spontaneous emission") or (2) interact with another photon, having the wavelength corresponding to the energy difference between quantum states, that forces the electron down to the lower energy level by the release of two photons (referred to as "spontaneous emission"). The average time the electron remains in the upper level (assuming the drop from the upper state to the lower state is by spontaneous recombination) is given by the relaxation constant (τ).

At low light intensities there is a much higher probability of an electron being excited to an upper energy level than an electron being forced down to the lower energy level because at low light intensities very few electrons exist in the upper state. At higher light intensities a higher fraction of the electrons build up in the upper state. Because more electrons exist in the upper state there is a larger probability of an electron being forced to a lower energy level. At the limit (extremely high light intensities) an equal number of electrons exist in the upper state as in the lower state. At this point there is an equal probability of an electron in the lower energy levels jumping to the upper energy level (absorbing a photon) as an electron in the upper energy level interacting with a photon and dropping to the lower energy level releasing two photons. If both processes are considered there is no net reduction of the number of photons. Hence, the absorption falls to zero.

A saturable absorber such as SA material 67 differs from, for example, a non-linear material. As discussed, a saturable absorber involves the transitions of electrons between quantum states. In contrast, non-linear materials, instead of relying on transitions, involve the non-linear reaction due to the electric field of the photons at high photon fluxes (i.e., high light intensity). This reaction is called the electric polarization (P). Because a saturable absorber requires a transition between states, it is highly selective as to which wavelength it can operate in (i.e., only wavelengths that correspond to an electronic transition can saturate a saturable absorber).

In one embodiment, input signal 69 carries information and is generally a relatively less intense beam. Control beam 66 is generally a relatively more intense beam that has enough power to alter the absorption of SA material 67, thus allowing input signal 69 to either transmit or not transmit through the output of switch 60.

In one embodiment of the present invention, both input signal 69 and control beam 66 are at the same wavelength and have the same polarizations. However, the two beams must be distinguished by propagation direction (i.e., both the signal and control beams cannot both end up propagating down the same output). Therefore in this embodiment, input signal 69 and control beam 66 intersects at SA material 67 in a perpendicular direction or in a counter-propagating direction.

SA material 67 has a relatively high absorption in the "off" state and a relatively low absorption in the "on" state. For example, in one embodiment, SA material 67 has an isolation of approximately 20dB (i.e., the power transmitted in the "on" state is 100 times greater than in the "off" state) and an insertion loss of less than approximately 1 dB (i.e., the optical signal loses less than 20% of its power as it travels through switch 60). In this embodiment, switch 60 should be between 80% and 90% transmitting in the "on" state and between 0.08% and 0.09% transmitting in the "off" state, because the power required to attain transparencies higher than 90% increases dramatically.

Figure 6:
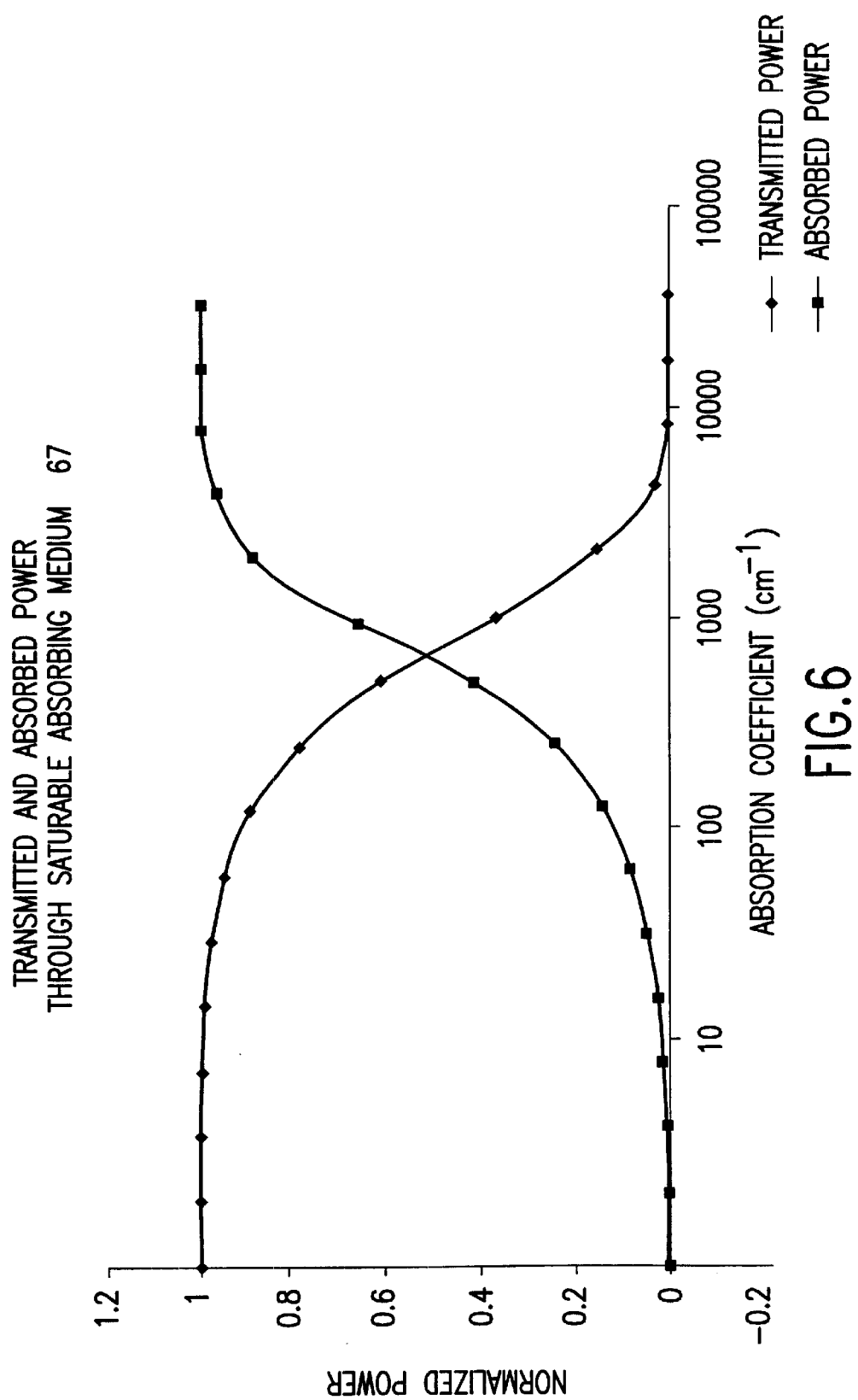
FIG. 6 is a graph illustrating the normalized power vs. the absorption coefficient of one embodiment of a saturable absorber material.

The applicable equation for determining the absorption requirements for SA material 67 is as follows:

$$I_{out} = I_{in} e^{-\alpha d}$$

where $\alpha$ is the absorption coefficient and d is the length of SA material 67. In an embodiment where SA material 67 has a length of 10 microns, an absorption coefficient of approximately 4700 cm$^{-1}$ is required for the "off" state (0.9% transmitting) and 100 cm$^{-1}$ for the "on" state (90% transmitting). FIG. 6 is a graph illustrating the normalized power vs. the absorption coefficient of one embodiment of SA material 67.

The intensity of control beam 66 required for the change from an "on" to "off" state is dependent upon the saturable absorber properties of SA material 67, especially the optical cross section of SA material 67. Typical intensities of control beam 66 in one embodiment range from as high as 90×10$^6$ W/cm$^2$ to as low as 100×10$^3$ W/cm$^2$. The actual power required by switch 60 is then determined from the intensity times the cross sectional area of SA material 67. A SA material with a cross sectional area of 1 square micron would require between 900 milliwatt and 1 milliwatt of power.

The speed of switch 60 is limited by the rate at which SA material 67 can reach transparency upon illumination and then decay back to its absorbing state when control beam 66 is turned off. In some embodiments, this rate can range from approximately 100 femtoseconds to 100 picoseconds.

One embodiment of SA material 67 is a composite material containing semiconductor nanocrystals (referred to as "quantum dots") contained in a glass or silicon matrix. Quantum dots interspersed within a matrix material offer an opportunity for an ideal saturable absorber for multiple reasons. For one, the quantum states of the quantum dots can be engineered to correspond to any wavelength simply by altering their size. Further, the density of quantum states (i.e., the number of electrons per unit volume that are able to jump from one quantum state to another) are much lower than in bulk semiconductor materials. Therefore, a lower intensity incident light beam is required for it to saturate. Further, quantum dots eliminate slower excitations that occur at high light intensities such as a two photon absorption that exists in bulk semiconductors. Therefore, the use of quantum dots enables a fast, low power (low intensity), and tunable saturable absorber.

In one embodiment, the quantum dots are comprised of Lead Sulfide (PbS) or Lead Selenide and are approximately 5 nanometers in diameter. In a further embodiment, the quantum dots are 5.7 nanometers in diameter. This size of the dots results in a large change of absorption with intensity while maintaining fast switching speed. The intensity of light required to saturate SA material 67 depends on the size and composition of the dots, as characterized by the optical cross section of SA material 67. The concentration of dots determines how thick a slab of material (quantum dots in glass) is required to produce a given change in intensity of the signal. In one embodiment, a thickness of 0.1 cm is required to arrive at a 20 dB signal change (assuming 50% saturation). Increasing the dot density allows the same change with a thinner device. The absorption length ($\alpha_0^{-1}$) is related to the optical cross section ($\sigma_0$) and the number density (dots per volume) of dots $N_d$ by:

$$\alpha_0 = N_d \sigma_0$$

A limitation exists to the concentration of dots within the matrix material because it is not possible to pack dots any closer than when they are touching. The densest packing configuration is the face-centered cubic ("FCC") lattice which has a packing density of 0.7.

In one embodiment, the quantum dots are produced in a glass matrix. The glass matrix material is beneficial for two reasons: (1) it is transparent to the light which is to be absorbed by the dots thus allowing the signal to be transmitted when switch 60 is in the "on" mode; and (2) the glass, having a much larger band gap than the quantum dot material, acts to confine the electron-hole pairs. This quantum confinement allows the requisite absorption spectrum to be obtained. In other embodiments, the matrix material is a plastic, or a semiconductor that is transparent to the operational wavelengths. Other possible matrix materials include Silicate, Borosilicate, and Phosphosilicate glasses, Polymethyl methacrylate (PMMA), Acrylic, polyamine polymers, and semiconductors including Silicon, Silicon Carbide, Cadmium Sulphide, Cadmiun Selenide, Cadmium Telluride, Zinc Sulphide, Aluminum Arsenide, Aluminum Phosphide, Gallium Arsenide.

In one embodiment, cladding is added to the quantum dots. The purpose of the cladding is to greatly increase the optical cross-section of the core semiconductor quantum dot, thus decreasing the optical power required for saturation as well as decreasing the relaxation time. An electrically conducting cladding material (like a metal) locally increases the light intensity within the core semiconductor, thus enhancing the absorption cross section. A semiconductor cladding material acts as a surface passivating agent and reduces the number of trapped states, which increases the absorption cross section.

The band-gap energy of the cladding material is wider than the band-gap of the core semiconductor. In one embodiment, switch 60 has an operational wavelength of 1500 nm (0.827 eV). In this embodiment, suitable semiconductor cladding materials include Silicon (Si), Silicon Carbide (SiC), Cadmium Sulfide (CdS), Cadmium Selenide (CdSe), Zinc Sulfide (ZnS), Zinc Selenide (ZnSe), Zinc Telluride (ZnTe), AlAs, AlP, AlSb, GaAs and InP. In addition, other materials that include metals such as Ag, Au and Al are appropriate for use as cladding materials.

The thickness of the cladding coating determines the enhancement of the absorption coefficient of the quantum dot material. The parameter describing the coating thickness is the ratio of the core radius to the shell radius ("arat"). Typical values of arat are between 0.7 and 0.85. Thus for core radii between 2.5 nm and 5.0 nm (appropriate for PbS), a shell thickness between 0.5 nm and 2.5 nm gives the desired enhancement.

In one embodiment, the quantum dots are manufactured using a thermal precipitation process that involves dissolving some amount of semiconductor material in a molten glass. The melt is controllably cooled until the quantum dots begin to precipitate out in the form of nano-crystals. A method for manufacturing quantum dots using a thermal precipitation process is disclosed in, for example, P. T. Guerreiro et al., "PbS Quantum-Dot Doped Glasses as Saturable Absorbers for Mode Locking of a Cr:Forsterite Laser", Appl. Phys. Lett. 71 (12), Sep. 22, 1997 at 1595.

In another embodiment, SA material 67 is manufactured using a colloidal growth process that involves growing nano-crystal quantum dots in a solution. Specifically, semiconductor precursors are introduced into a heated surfactant solution. The precursors crack in the solution and the semiconductors combine to form the nano-crystals. The quantum dots can then be removed from the solution and combined with a powdered glass solution. The powdered glass, referred to as a "sol-gel" can be shaped into a variety of forms. The sol-gel can be sintered into a large block, drawn and sintered into a fiber, or spun on a substrate and sintered to form a thin film. A method for manufacturing quantum dots using a colloidal growth process is disclosed in, for example: (1) U.S. Pat. No. 5,505,928, entitled "Preparation of III–V Semiconductor Nanocrystals"; (2) Nozik et al., "Colloidal Quantum Dots of III–V Semiconductors", MRS Bulletin, February 1998 at 24; and (3) Hao et al., "Synthesis and Optical Properties of CdSe and CdSe/CdS Nanoparticles", Chem. Mater. 1999, 11 at 3096.

In one embodiment, substrate 62 of switch 60 is made of semiconductor or glass and is less than 1 mm thick. Waveguides 63, 64 and 68 of switch 60 in accordance with one embodiment are in the form of optical dielectric waveguides consisting of transparent glass, polymer, or semiconductor materials transparent to the wavelength at which switch 60 is operating at (i.e., the semiconductor band-gap is greater than the energy of the operation wavelength photon energies).

The waveguides may be in the form of integrated ridge or buried type waveguides or integrated waveguides based upon photonic crystals. In the ridge and buried waveguides embodiments, the guiding conditions dictate that the waveguide material have a higher dielectric constant (i.e., higher index of refraction n) than the cladding material index. In other embodiments, the waveguide may be of the form of an optical fiber. In one embodiment, the cross sectional areas of the waveguide are of the size to support a guided wave at the operational wavelength. In various embodiments, the dimensions of the waveguides are between 0.5 micron and 10 microns in diameter depending on the waveguide material, operational wavelength, and number of modes that are transmitted through the waveguide. The input waveguide should have the same cross sectional dimensions as the output waveguide.

Specific waveguide materials include but are not restricted to Silicate, Borosilicate, and Phosphosilicate glasses, Polymethyl methacrylate (PMMA), Acrylic, polyamine polymers, and semiconductors including Silicon, Silicon Carbide, Cadmiun Sulphide, Cadmiun Selenide, Cadmium Telluride, Zinc Sulphide, Aluminum Arsenide, Aluminum Phosphide, Gallium Arsenide. In most embodiments, the probable semiconductor to be used as a waveguide is silicon or gallium arsenide. The reason that the above materials are transparent is that the bandgap energy is greater than that of the energy of the incident photons.

In one embodiment of the present invention, SA material 67 has an antireflective layer coupling the signal input and output to the active region to compensate for SA material 67 having a different refractive index than that of the input/output waveguides. FIG. 7 is a cross-sectional view of a switch 70 in accordance with one embodiment of the present invention in which an input waveguide 72 and an output waveguide 74 have a Bragg Grating antireflective region 76 to compensate for the different refractive indexes. FIG. 8 is a cross-sectional view of a switch 80 in accordance with one embodiment of the present invention in which an input waveguide 82 and an output waveguide 84 have a thin film dielectric antireflective layer 86 to compensate for the different refractive indexes.

FIG. 9 is a cross-sectional view of a switch 90 in accordance with one embodiment of the present invention in which the intensity of the control beam is enhanced within SA material 67. In switch 90, SA material 67 is placed in a mirrored cavity formed by mirrors 96, with mirrors 96 perpendicular to the propagation direction of the control beam within a control beam waveguide 92. Mirrors 96 may be in the form of thin film dielectric layers, Bragg mirrors, or metallized surfaces. The cavity dimensions are such that it resonates at the control beam wavelength. The purpose of the resonant cavity is to enhance the absorption of the control beam within SA material 67. When switch 90 is in the "on" state the absorption of SA material 67 is reduced dramatically. Without the resonant cavity much of the control beam is transmitted through the active region and is therefore wasted. The addition of a resonant cavity effectively keeps the control beam within the active region, thereby reducing the control beam power required for a given level of saturation.

Figure 10:
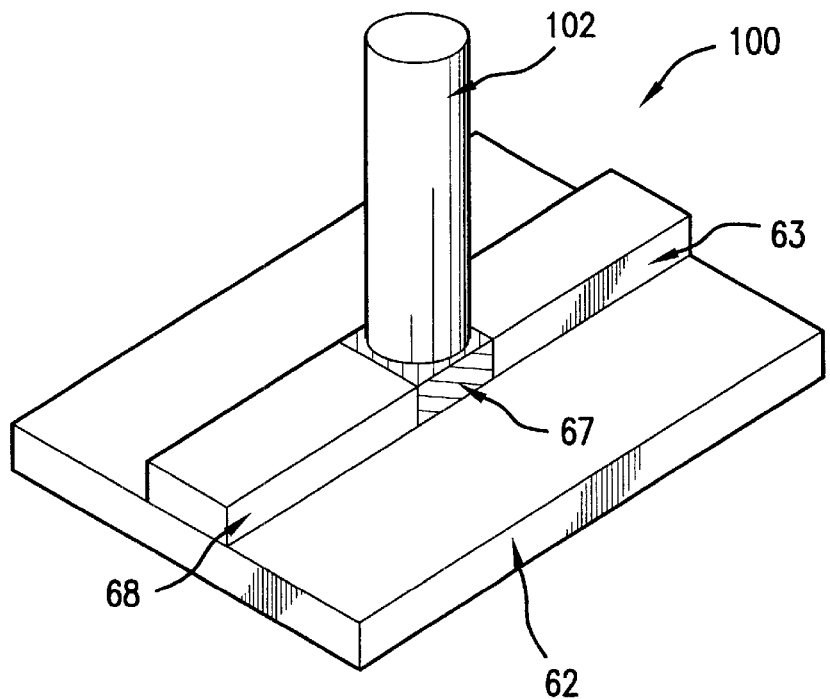
FIG. 10 is a perspective view of a switch in accordance with one embodiment of the present invention in which the control beam waveguide is out of the plane of the substrate.

FIG. 10 is a perspective view of a switch 100 in accordance with one embodiment of the present invention. In switch 100, a control beam waveguide 102 is out of the plane and perpendicular to substrate 62. However, input waveguide 68 and output waveguide 63 remain in the plane of substrate 62. In one embodiment, control beam waveguide 102 is an optical fiber.

Figure 11:
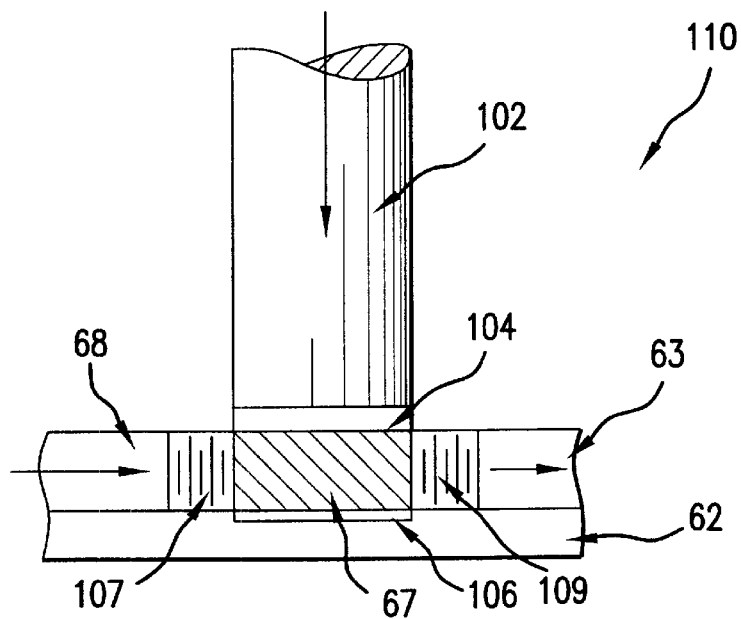
FIG. 11 is a sectional view of a switch in accordance with one embodiment of the present invention in which the control beam waveguide is out of the plane of substrate.

FIG. 11 is a sectional view of a switch 110 in accordance with one embodiment of the present invention in which control beam waveguide 102 is out of the plane of substrate 62. Switch 110 includes mirrors 104 and 106 to enhance the intensity of the control beam within SA material 67. Switch 110 further includes anti-reflective layers 107 and 109 to compensate for different refractive indexes of SA medium 67 and input and output waveguides 68 and 63.

Figure 12:
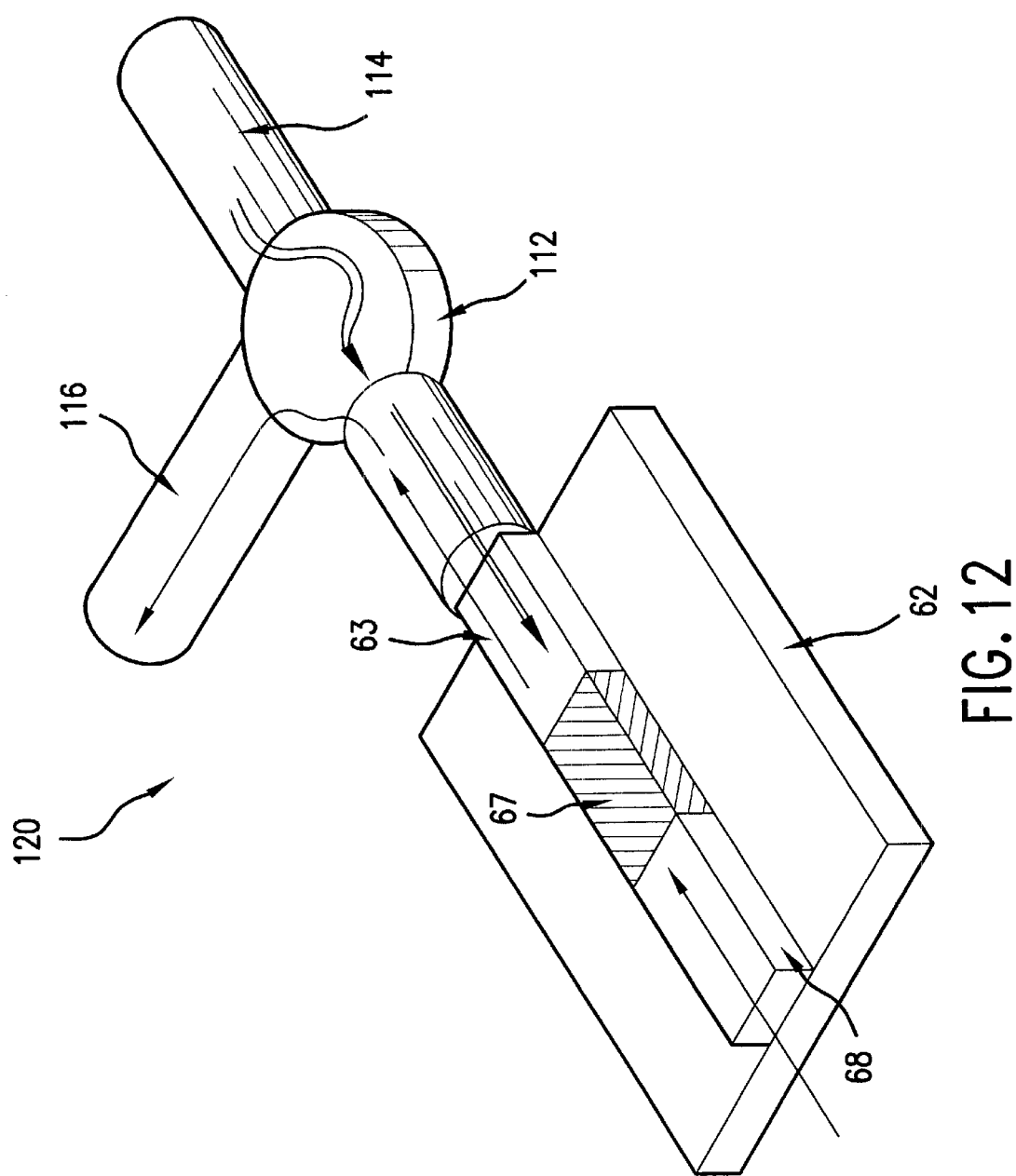
FIG. 12 is a sectional view of a switch in accordance with one embodiment of the present invention which has counter-propagating signal and control beams.

FIG. 12 is a sectional view of a switch 120 which has counter-propagating signal and control beams. Switch 120 includes an optical circulator 112, an external output waveguide 116, and a control beam waveguide 114. The control beam is continuous with the signal output beam. Optical circulator 112 separates the signal output from the control beam input.

Figure 13:
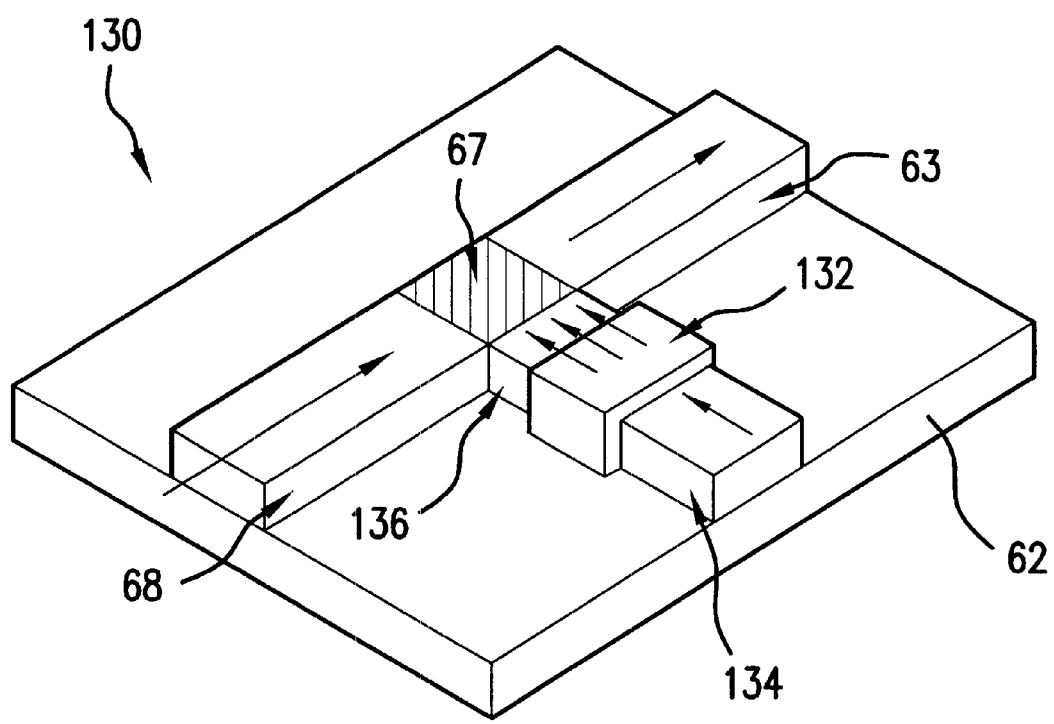
FIG. 13 is a sectional view of a switch which utilizes a low power signal as a control beam.

As previously discussed, in one embodiment of the present invention, the control beam power is several orders of magnitude higher than that of the input signal beam. For example, in one embodiment the power of the input signal beam is approximately 1–10 mW while the control beam power is approximately 100–200 mW. This high power of the control beam can be supplied directly via a high power laser coupled to the control beam waveguide, or it can be derived by amplifying a lower power signal. FIG. 13 is a sectional view of a switch 130 in accordance with one embodiment of the present invention which utilizes a low power signal as a control beam. Switch 130 includes an optical amplifier 132 coupled to a low power portion 134 of a control beam waveguide and a high power portion 136 of a control beam waveguide. In one embodiment, optical amplifier 132 is a semiconductor optical amplifier ("SOA"). The SOA can be coupled to the control beam waveguide or be integrated onto substrate 62 with switch 130 and directly coupled into SA material 67. In another embodiment, optical amplifier 132 is an Erbium doped fiber amplifier ("EDFA").

As described, one embodiment of the present invention is an all-optical switch that utilizes a saturable absorber. The use of a saturable absorber provides many benefits over the prior art including:

Integratability—the present invention is inherently more compact than index change based devices that rely on interference through a relatively large structure such as Mach-Zender interferometers and optical loop mirrors. In addition, switches in accordance with the present invention can be fabricated using thin film processing techniques. The fabrication processes and small device size allows for many devices to be integrated onto a single substrate and connected together.

High speed operation—the present invention using a saturable absorber works extremely rapidly, on the order of picoseconds. This speed is orders of magnitude faster than mechanical optical switches, liquid crystal based switches, and nearly all other electro-optic, magneto-optic and acousto-optic based switching devices. The high-speed operation allows for a high data rate to be transmitted and processed by the present invention.

Low power operation—Depending upon the optical cross section, the SA material of the present invention is able to reduce the absorption coefficient with relatively low power. For example, the power required to change the material from 90% absorbing to 0.9% absorbing requires power ranging from less than a milliwatt to several hundred milliwatts.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although a relatively simple on-off optical switch has been described, the switch can function as a transistor, and can form the basis for more complex optical logic and computing circuitry. In turn, the logic circuitry can be used to accomplish higher-level communications protocols including optical time domain multiplexing and optical packet switching that are currently unattainable with known technologies. In addition, the all-optical switch in accordance with the present invention could form the basis for optical Read Only Memories ("ROM"s) and Programmable Read Only Memories ("PROM"s) and combinatorial and synchronous circuits including adding circuitry, flip-flops, counters, and registers. Therefore, a computer system can include, for example, a processor formed from the optical switches, and memory formed from the optical switches.

What is claimed is:

1. An optical switch comprising:
   a saturable absorber;
   an input waveguide coupled to said saturable absorber;
   an output waveguide coupled to said saturable absorber;
   at least one thin-film anti-reflective layer; and
   a control beam waveguide coupled to said saturable absorber.

2. The optical switch of claim 1, wherein said saturable absorber comprises a plurality of electrons having a first and a second state, and wherein said electrons are in said first state when substantially no light is input to said control beam waveguide, and a portion of said electrons are in said second state when light is input to said control beam waveguide.

3. The optical switch of claim 2, wherein said first state is a lower energy state, and said second state is an upper energy state.

4. The optical switch of claim 1, wherein said saturable absorber comprises quantum dots.

5. The optical switch of claim 4, wherein said quantum dots comprise Lead Sulfide.

6. The optical switch of claim 1, further comprising a substrate coupled to said input waveguide, said output waveguide, and said control beam waveguide.

7. The optical switch of claim 4, wherein said saturable absorber comprises cladding coupled to said quantum dots.

8. The optical switch of claim 7, wherein said quantum dots are manufactured using a colloidal growth process.

9. The optical switch of claim 6, wherein said control beam waveguide and said substrate are on a first plane.

10. The optical switch of claim 6, wherein said control beam waveguide is on a first plane and said substrate is on a second plane, wherein said first plane and said second plane are different planes.

11. The optical switch of claim 1, further comprising at least one Bragg Grating reflective region.

12. The optical switch of claim 1, further comprising at least one mirror coupled to said saturable absorber.

13. The optical switch of claim 1, further comprising an optical amplifier coupled to said control beam waveguide.

14. The optical switch of claim 1, further comprising an optical circulator coupled to said output waveguide and said control beam waveguide.

15. An optical switch comprising:
a saturable absorber;
a control beam having a first state and a second state coupled to said saturable absorber;
at least one thin-film anti-reflective layer; and
an input beam coupled to said saturable absorber;
wherein said input beam is absorbed by said saturable absorber when said control beam has said first state, and wherein said input beam passes through said saturable absorber when said control beam has said second state.

16. The optical switch of claim 15, wherein in said first state said control beam is substantially off, and wherein in said second state said control beam is on.

17. The optical switch of claim 15, wherein said saturable absorber comprises a plurality of electrons, and wherein said plurality of electrons are in a lower energy state when said control beam has said first state, and a portion of said plurality of electrons are in a higher energy state when said control beam has said second state.

18. The optical switch of claim 15, wherein said saturable absorber comprises quantum dots.

19. The optical switch of claim 18, wherein said saturable absorber comprises cladding coupled to said quantum dots.

20. The optical switch of claim 19, wherein said quantum dots are manufactured using a colloidal growth process.

21. An transistor comprising:
a saturable absorber;
an input waveguide coupled to said saturable absorber;
an output waveguide coupled to said saturable absorber;
at least one thin-film anti-reflective layer; and
a control beam waveguide coupled to said saturable absorber.

22. The transistor of claim 21, wherein said saturable absorber comprises a plurality of electrons having a first and a second state, and wherein said electrons are in said first state when substantially no light is input to said control beam waveguide, and a portion of said electrons are in said second state when light is input to said control beam waveguide.

23. The transistor of claim 22, wherein said first state is a lower energy state, and said second state is an upper energy state.

24. The transistor of claim 21, wherein said saturable absorber comprises quantum dots.

25. The transistor of claim 24, wherein said quantum dots comprise Lead Sulfide.

26. The transistor of claim 21, further comprising a substrate coupled to said input waveguide, said output waveguide, and said control beam waveguide.

27. The transistor of claim 24, wherein said saturable absorber comprises cladding coupled to said quantum dots.

28. The transistor of claim 27, wherein said quantum dots are manufactured using a colloidal growth process.

29. The transistor of claim 26, wherein said control beam waveguide and said substrate are on a first plane.

30. The transistor of claim 26, wherein said control beam waveguide is on a first plane and said substrate is on a second plane, wherein said first plane and said second plane are different planes.

31. The transistor of claim 21, further comprising at least one Bragg Grating reflective region.

32. The transistor of claim 21, further comprising at least one mirror coupled to said saturable absorber.

33. The transistor of claim 21, further comprising an optical amplifier coupled to said control beam waveguide.

34. The transistor of claim 21, further comprising an optical amplifier coupled to said output waveguide and said control beam waveguide.

35. A computer system comprising:
a memory;
a processor coupled to said memory;
wherein said memory comprises:
a saturable absorber;
an input waveguide coupled to said saturable absorber;
an output waveguide coupled to said saturable absorber;
at least one thin-film anti-reflective layer; and
a control beam waveguide coupled to said saturable absorber.

36. The computer system of claim 35, wherein said saturable absorber comprises a plurality of electrons having a first and a second state, and wherein said electrons are in said first state when substantially no light is input to said control beam waveguide, and a portion of said electrons are in said second state when light is input to said control beam waveguide.

37. The computer system of claim 36, wherein said first state is a lower energy a state, and said second state is an upper energy state.

38. The computer system of claim 35, wherein said saturable absorber comprises quantum dots.

39. The computer system of claim 38, wherein said saturable absorber comprises cladding coupled to said quantum dots.

40. A method of switching an optical signal comprising:
inputting the optical signal to a saturable absorber;
inputting a control beam having a first state and a second state to the saturable absorber;
absorbing the optical signal when the control beam has the first state; and
transmitting the optical signal when the control beam has the second state;
wherein at least one thin-film anti-reflective layer is coupled to the saturable absorber.

41. The method of claim 40, wherein in said first state said control beam is substantially off, and wherein in said second state said control beam is on.

42. The method of claim 40, wherein said saturable absorber comprises a plurality of electrons, and wherein said plurality of electrons are in a lower energy state when said control beam has said first state, and a portion of said plurality of electrons are in a higher energy state when said control beam has said second state.

43. The method of claim 40, wherein the saturable absorber comprises quantum dots.

44. The method of claim 40, wherein said saturable absorber comprises cladding coupled to said quantum dots.

* * * * *